US012694242B2

(12) United States Patent
Koprowski et al.

(10) Patent No.: US 12,694,242 B2
(45) Date of Patent: Jul. 28, 2026

(54) LOW POWER BEACON SCHEDULING

(71) Applicant: CHORUSVIEW, INC., Las Vegas, NV (US)

(72) Inventors: Brion Koprowski, Boulder, CO (US); Dean Kawaguchi, San Jose, CA (US); Adrian Wong, Boulder, CO (US); Amit Lal, Ithaca, NY (US)

(73) Assignee: CHORUSVIEW, INC., Las Vegas, NV (US)

( * ) Notice: Subject to any disclaimer, the term of this patent is extended or adjusted under 35 U.S.C. 154(b) by 174 days.

(21) Appl. No.: 18/489,324

(22) Filed: Oct. 18, 2023

(65) Prior Publication Data

US 2024/0070412 A1    Feb. 29, 2024

Related U.S. Application Data

(63) Continuation-in-part of application No. 17/728,199, filed on Apr. 25, 2022.

(51) Int. Cl.
    *G06K 7/10*      (2006.01)
    *G06K 19/07*    (2006.01)

(52) U.S. Cl.
    CPC ..... *G06K 7/10366* (2013.01); *G06K 19/0723* (2013.01)

(58) Field of Classification Search
    CPC ...................... G06K 7/10366; G06K 19/0723
    See application file for complete search history.

(56) References Cited

U.S. PATENT DOCUMENTS 7,817,015 B1   10/2010  Tiernay et al.
2010/0060423 A1*  3/2010  Pillai ........................ H04Q 9/00
                                340/10.1

(Continued)

FOREIGN PATENT DOCUMENTS

CN       109120362 B    1/2021
JP       2008148215 A   6/2008

(Continued)

OTHER PUBLICATIONS

English Translation of KR 20090030527 (Year: 2009).*

(Continued)

*Primary Examiner* — Patrick N Edouard
*Assistant Examiner* — Eboni N Giles
(74) *Attorney, Agent, or Firm* — Botos Churchill IP Law LLP

(57) ABSTRACT

The technology relates to a wireless system that can be used indoors or outdoors, and is configured to reduce interference of beacon signals on channels used by the system. Aspects of the technology provide for evaluation of channel activity to determine an optimal transmission channel. This is beneficial where there is a high density of tags that may be configured for data transmission. Tags may include an antenna to receive signals; a first conditioning element to attenuate received signals corresponding with the system channels; a converter and a second conditioning element to prepare attenuated signals for analysis; a comparator to compare an attenuated signal to a threshold value; and a processor to transmit a beacon signal to a reader apparatus based on the comparison.

19 Claims, 9 Drawing Sheets

(56) References Cited

U.S. PATENT DOCUMENTS

| | | | | |
|---|---|---|---|---|
| 2012/0007683 | A1* | 1/2012 | Song | H01Q 7/00 |
| | | | | 331/34 |
| 2016/0359378 | A1* | 12/2016 | Kuhn | G01D 11/00 |
| 2017/0132439 | A1 | 5/2017 | Nikunen et al. | |
| 2021/0027608 | A1* | 1/2021 | Shakedd | G08B 21/24 |

FOREIGN PATENT DOCUMENTS

| | | | |
|---|---|---|---|
| JP | 2017521784 | A | 8/2017 |
| KR | 20070035295 | A | 3/2007 |
| KR | 20090030527 | A | 3/2009 |

OTHER PUBLICATIONS

English Translation of JP 2008148215 (Year: 2008).*
International Search Report and Written Opinion for International Application No. PCT/US2023/019171 dated Jul. 18, 2023 (8 pages).
Akan, Ozgur B., et al., "Cognitive radio sensor networks", Cognitive radio sensor networks | IEEE Journals & Magazine | IEEE Xplore, retrieved from the Internet on Nov. 15, 2021, pp. 1-3.
Akan, Ozgur B., et al., "Cognitive Radio Sensor Networks", Next generation Wireless Communications Laboratory (NWCL), Department of Electrical and Electronics Engineering, 2009, pp. 1-14.
Assarian, Ali , et al., "A beacon analysis-based RFID reader anti-collision protocol for dense reader environments", Computer Communications, A beacon analysis-based RFID reader anti-collision protocol for dense reader environments—ScienceDirect, retrieved from the Internet Nov. 15, 2021, pp. 1-2.

Awati, Rahul , "What Is Cognitive Radio (CR) and How Does It Work?", https://www.techtarget.com/searchnetworking/definition/cognitive-radio, retrieved from the internet Nov. 15, 2021, pp. 1-5.
Bello, Hilal , et al., "Advances and Opportunities in PassiveWake-Up Radios withWireless Energy Harvesting for the Internet of Things Applications", Sensors, 2019, 19, pp. 1-33.
Chiang, Yi-Hsuan , et al., "RF-CoHetNet: An Architecture for Cognitive Heterogeneous Networks Powered by RF-Energy", IEEE Journals & Magazine, https://ieeexplore.ieee.org/abstract/document/7731595, retrieved from the Internet Nov. 15, 2021, pp. 1-3.
Gao, Song , et al., "Distributed Energy Efficient Spectrum Access in Cognitive Radio Wireless Ad Hoc Networks", IEEE Transactions on Wireless Communications, vol. XX, No. XX, Month 2009, pp. 1-13.
Joshi, Gyanendra Prasad, et al., "Cognitive Radio Wireless Sensor Networks: Applications, Challenges and Research Trends", Sensors 2013, 13, pp. 11196-11228; doi:10.3390/s130911196.
Pozza, Riccardo , et al., "Neighbor Discovery for Opportunistic Networking in Internet of Things Scenarios: A Survey", Special Section on Artificial Intelligence Enabled Networking, IEEE Access, vol. 3, 2015, pp. 1101-1131.
Ren, Ju , "RF Energy Harvesting and Transfer in Cognitive Radio Sensor Networks: Opportunities and Challenges", https://ieeexplore.ieee.org/abstract/document/8255747, retrieved from the Internet Nov. 15, 2021, pp. 1-3.
International Search Report and Written Opinion for International Application No. PCT/US2024/048305 dated Dec. 30, 2024 (12 pages).

* cited by examiner

Warehouse

In Transit

Hospital

100

200

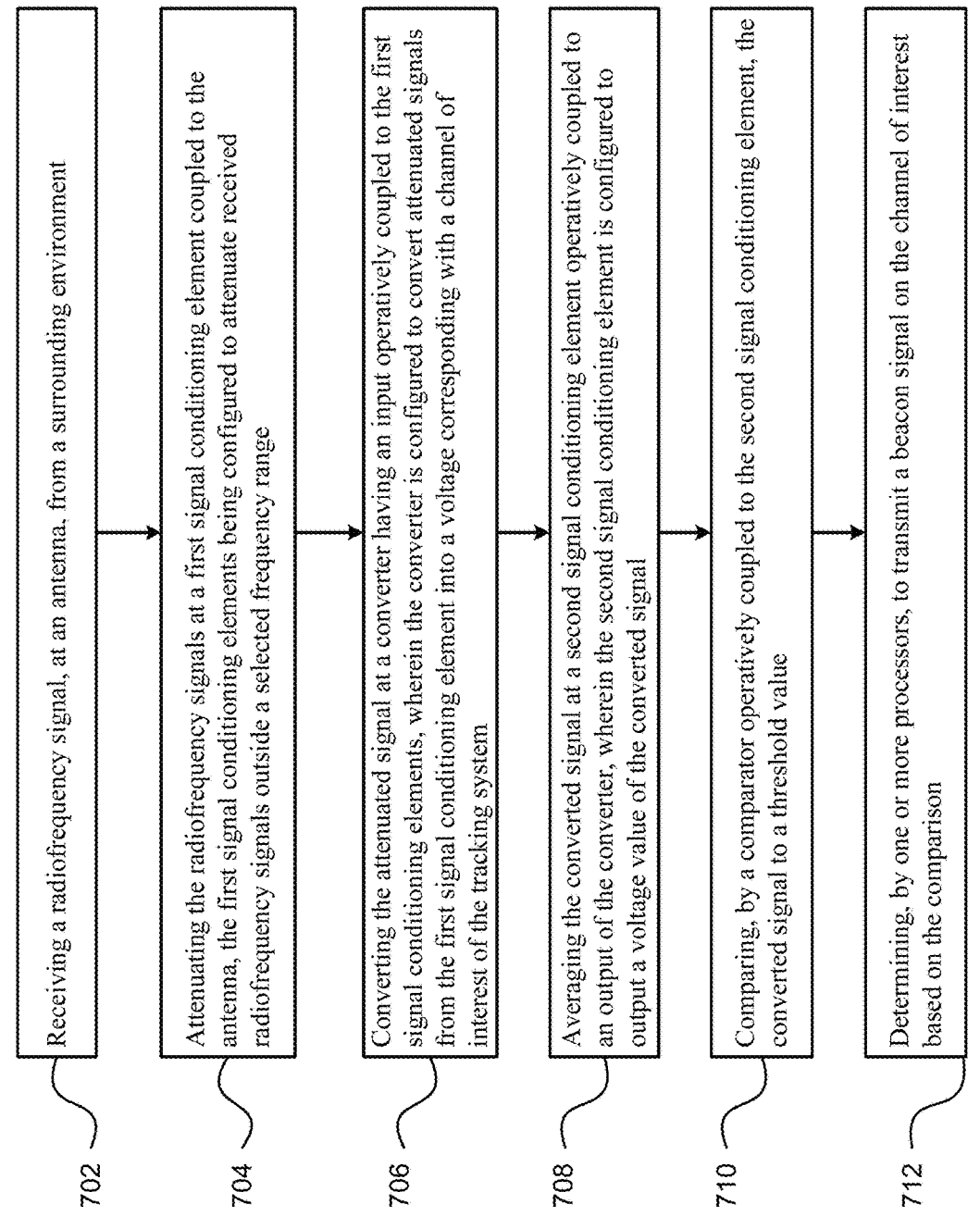

700

702  Receiving a radiofrequency signal, at an antenna, from a surrounding environment 704  Attenuating the radiofrequency signals at a first signal conditioning element coupled to the antenna, the first signal conditioning elements being configured to attenuate received radiofrequency signals outside a selected frequency range 706  Converting the attenuated signal at a converter having an input operatively coupled to the first signal conditioning elements, wherein the converter is configured to convert attenuated signals from the first signal conditioning element into a voltage corresponding with a channel of interest of the tracking system 708  Averaging the converted signal at a second signal conditioning element operatively coupled to an output of the converter, wherein the second signal conditioning element is configured to output a voltage value of the converted signal 710  Comparing, by a comparator operatively coupled to the second signal conditioning element, the converted signal to a threshold value 712  Determining, by one or more processors, to transmit a beacon signal on the channel of interest based on the comparison

FIGURE 7

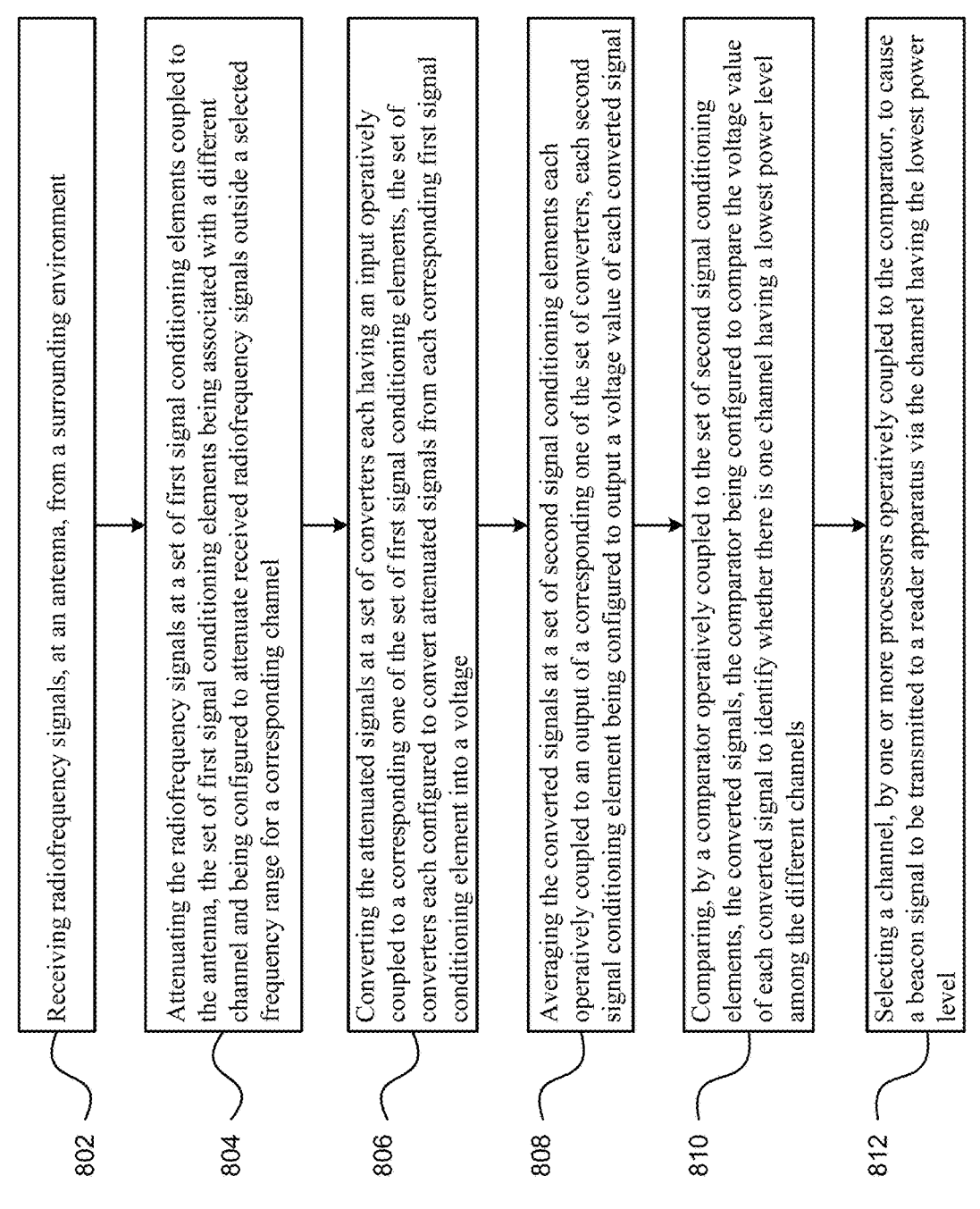

802  Receiving radiofrequency signals, at an antenna, from a surrounding environment 804  Attenuating the radiofrequency signals at a set of first signal conditioning elements coupled to the antenna, the set of first signal conditioning elements being associated with a different channel and being configured to attenuate received radiofrequency signals outside a selected frequency range for a corresponding channel 806  Converting the attenuated signals at a set of converters each having an input operatively coupled to a corresponding one of the set of first signal conditioning elements, the set of converters each configured to convert attenuated signals from each corresponding first signal conditioning element into a voltage 808  Averaging the converted signals at a set of second signal conditioning elements each operatively coupled to an output of a corresponding one of the set of converters, each second signal conditioning element being configured to output a voltage value of each converted signal 810  Comparing, by a comparator operatively coupled to the set of second signal conditioning elements, the converted signals, the comparator being configured to compare the voltage value of each converted signal to identify whether there is one channel having a lowest power level among the different channels 812  Selecting a channel, by one or more processors operatively coupled to the comparator, to cause a beacon signal to be transmitted to a reader apparatus via the channel having the lowest power level

LOW POWER BEACON SCHEDULING

CROSS-REFERENCE TO RELATED APPLICATIONS

This application is a continuation-in-part of U.S. application Ser. No. 17/728,199, filed Apr. 25, 2022, the entire disclosure of which is incorporated herein by reference.

BACKGROUND

The Internet of Things (IoT) involves the inter-networking of physical objects, such as products, packages, vehicles, buildings, etc., that are embedded with electronic components for network connectivity. The embedded components enable objects to detect others, be detected by others, collect data and/or transmit data. In some examples, the embedded components may include tags or labels attached to the physical objects or items. These tags or labels may be passive or active. The inter-networking capabilities may be leveraged for tracking locations of physical objects. In many situations, objects may be moved at different points in time, such as a package or equipment moved from a truck to a loading dock to a warehouse, or medical equipment that is moved between different rooms (or floors) in a hospital. These types of situations can be very challenging to determine the location of the object with suitable accuracy, including updating of the location as it changes.

Signal interference may occur during tracking when multiple tags or labels attempt to transmit on the same channel at the same time. Such interference is of particular concern when a system contains a number of items with tags or labels, as it can lead to lost data and greater power consumption for devices that are not easily recharged. In a dense system, many items will attempt to transmit when a channel is busy, that is, when other items are transmitting on the same channel at the same time, leading to interference. Additionally, interference may be caused by sources outside the system operating on the same channels or overlapping frequency bands.

BRIEF SUMMARY

The technology relates to a Bluetooth low energy (BLE) system that can be used indoors or outdoors, in particular, a system configured to reduce interference of beacon signals on channels used by the system. Aspects of the technology provide an effective solution for evaluation of channel activity to determine an optimal transmission channel and/or time. This is applicable in any situation where there is a high density of labels or other tags (collectively, "tags") that may be configured for data transmission. Examples include pallets with individual items tagged in the back of a transport vehicle, storage warehouses or lots, medical equipment and supplies that may be moved as needed to different rooms in a hospital or lab setting, etc.

One aspect of the technology relates to a tracking tag. The tracking tag comprising an antenna configured to receive radiofrequency signals from a surrounding environment; a first signal conditioning element coupled to the antenna, the first signal conditioning elements being configured to attenuate received radiofrequency signals outside a selected frequency range, the selected frequency range corresponding to one or more channels of the system; a converter coupled to the first signal conditioning element, wherein the converter is configured to convert attenuated signals from the first signal conditioning element into a voltage corresponding with a channel of interest of a tracking system; a second signal conditioning element coupled to an output of the converter, wherein the second signal conditioning element is configured to output a voltage value of a converted signal from the converter; a comparator operatively coupled to the second signal conditioning element, wherein the second signal conditioning element, the converted signal to a threshold value; and one or more processors operatively coupled to the comparator, the one or more processors being configured to transmit a beacon signal on the channel of interest based on a comparison of the comparator.

In one example, the one or more processors are further configured to transmit the beacon signal when a power level for the channel of interest is below the threshold value.

In another example, one or more processors are further configured to delay transmission of the beacon signal when a power level for the channel of interest is above the threshold value. Additionally, the one or more processors may be configured to delay transmission of the beacon signal when the power level for the channel of interest is above the threshold value for a predetermined period of time or a random period of time.

In a further example, the voltage value of a converted signal is an average voltage value.

In an additional example, the tracking tag further includes a transmitter module operatively coupled to the one or more processors and configured to prepare one or more data packets based on information from the one or more processors for transmission, wherein the transmitter module is pre-tuned to the channel of interest; and a multiplexer operatively coupled to the transmitter module and the antenna configured to separate receive operations and transmit operations.

In one example, the antenna is a first antenna configured to only receive radiofrequency signals from a surrounding environment, and the tracking tag further includes a transmitter module operatively coupled to the one or more processors and configured to prepare one or more data packets of information from the one or more processors for transmission; and a second antenna operatively coupled to the one or more processors and the transmitter module, the second antenna being configured to transmit the beacon signal.

In a further example, the antenna is configured to re-sample the surrounding environment; and the converter is configured to convert attenuated signals from the first signal conditioning element into a voltage corresponding with a second channel distinct from the channel of interest.

In an additional example, the converter is an energy harvester configured to harvest energy from the attenuated signal, and the comparator and the one or more processors are configured to be powered by energy harvested by the energy harvester.

Another aspect of the technology provides a method of beacon scheduling within a tracking system. The method comprising receiving a radiofrequency signal, at an antenna, from a surrounding environment; attenuating the radiofrequency signal at a first signal conditioning element coupled to the antenna, the first signal conditioning elements being configured to the received radiofrequency signals outside a selected frequency range, the selected frequency range corresponding to one or more channels of the system; converting the attenuated signal at a converter having an input operatively coupled to the first signal conditioning elements, wherein the converter is configured to convert attenuated signals from the first signal conditioning element into a voltage corresponding with a channel of interest of the tracking system; averaging the converted signal at a second signal conditioning element operatively coupled to an output of the converter, wherein the second signal conditioning element is configured to output a voltage value of the converted signal; comparing, by a comparator operatively coupled to the second signal conditioning element, the converted signal to a threshold value; and determining, by one or more processors, to transmit a beacon signal on the channel of interest based on the comparison.

In one example, the method further includes determining, by the one or more processors, whether a power level of the channel of interest is above or below a threshold value.

In another example, the method further includes delaying transmission of the beacon signal when the power level of the channel of interest is above the threshold value. Additionally, delaying transmission of the beacon signal when the power level of the channel of interest is above the threshold value may occur for a predetermined period of time or a random period of time.

In a further example, the method further includes repeating the method steps of receiving a radiofrequency signal, at an antenna, from a surrounding environment; attenuating the radiofrequency signal at a first signal conditioning element coupled to the antenna, the first signal conditioning elements being configured to the received radiofrequency signals outside a selected frequency range, the selected frequency range corresponding to one or more channels of the system; converting the attenuated signal at a converter having an input operatively coupled to the first signal conditioning elements, wherein the converter is configured to convert attenuated signals from the first signal conditioning element into a voltage corresponding with a channel of interest of the tracking system; averaging the converted signal at a second signal conditioning element operatively coupled to an output of the converter, wherein the second signal conditioning element is configured to output a voltage value of the converted signal; comparing, by a comparator operatively coupled to the second signal conditioning element, the converted signal to a threshold value; determining, by the one or more processors, whether a power level of the channel of interest is above or below a threshold value; and determining, by one or more processors, to transmit a beacon signal on the channel of interest based on the comparison when the power level of the channel of interest is above the threshold value. Additionally, the repetition may occur a maximum number of times during a timestep when the power level of the channel of interest is above the threshold value.

In an additional example, the method further includes transmitting, by the antenna, the beacon signal when the power level of the channel of interest is below the threshold value.

In another example, the method further includes transmitting, by a second antenna, the beacon signal when the power level of the channel of interest is below the threshold value.

In one example, the method further includes mixing, at the converter, a signal from a local oscillator (LO) with the attenuated signal from the first signal conditioning element; wherein the LO is pre-tuned to the channel of interest.

In another example, the method further includes pre-tuning a transmitter module for transmission on the channel of interest.

In an additional example, the method further includes updating the threshold value, wherein the threshold value is updated incrementally.

BRIEF DESCRIPTION OF DRAWINGS

FIG. 7 illustrates an example method in accordance with aspects of the disclosure.

FIG. 8 illustrates an example method in accordance with aspects of the disclosure.

DETAILED DESCRIPTION

Figure 1A:
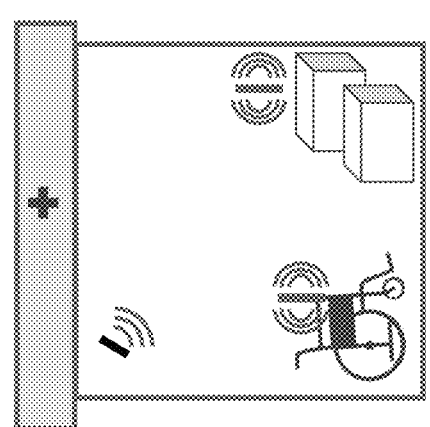
FIG. 1A illustrates various examples for localization of objects in accordance with aspects of the technology.
Figure 1A:
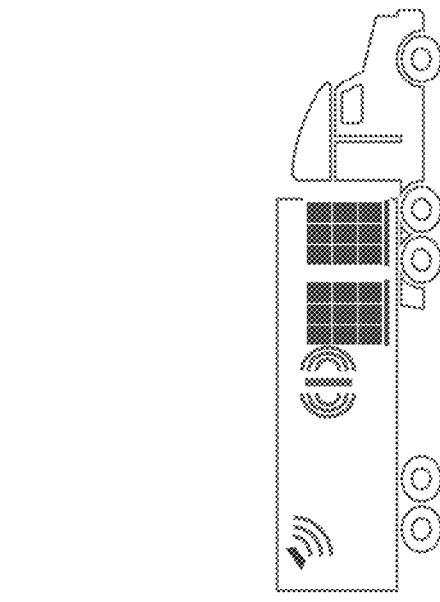
Figure 1A:
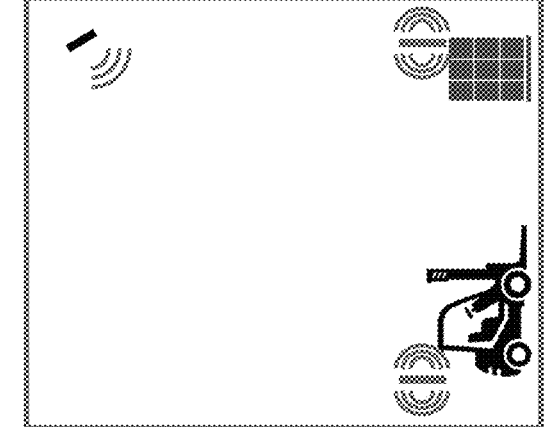

Implementations of the present disclosure are described in detail with reference to the drawing figures wherein like reference numerals identify similar or identical elements. It is to be understood that the disclosed implementations are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Example Systems

Maximizing data transfer and minimizing power consumption for the tracking of objects can be important for a number of reasons, including the localization of tracked objects. For example, knowing where supplies or equipment are stored and whether additional materials need to be ordered can be critically important for logistics or "just in time" operations management. In a warehouse setting, upon arrival at the warehouse, pallets of goods may be moved to different locations depending on storage limitations, when the goods need to be shipped out, and where the goods are going. In a commercial, industrial or hospital setting, equipment may be stored in one location (e.g., a storeroom, warehouse or depot), placed in different rooms for use, and then moved when the need arises, such as moving a hospital bed from one room to another, or moving a backup generator from storage in order to run a heating, ventilation and air conditioning (HVAC) system. The ability to more effectively communicate tracking details can be vital to such operations.

FIG. 1A illustrates examples of different objects in various environments. As shown on the left side image of the figure, there may be packages or equipment on a pallet in a warehouse. The pallet may have come off of a cargo truck as shown by the "In Transit" image in the middle of the figure. The pallet may be moved to one or more different locations within a warehouse, such as by the forklift shown in the left side image. The right side image in the figure illustrates a situation where medical equipment (e.g., a wheelchair) and supplies in boxes may be stored in a supply room in a hospital.

In all of these situations—in the warehouse, on the cargo truck, or at the hospital, the objects of interest may move around. That may be to a different aisle or room in the warehouse, a different room (or even a different floor) of the hospital, or different part of the cargo container of the truck. In the latter case, the cargo may have shifted during transit or may have been repositioned as different packages were delivered to different locations. Knowing where the objects of interest are currently located, as opposed to where they are presumed to be based on an initial placement, is a valuable piece of information for an office manager, warehouse manager, nurse or orderly to have. Ideally, such people should be able to get the current location of a given object on their client computing device such as a laptop, mobile phone or smartwatch.

Figure 1B:
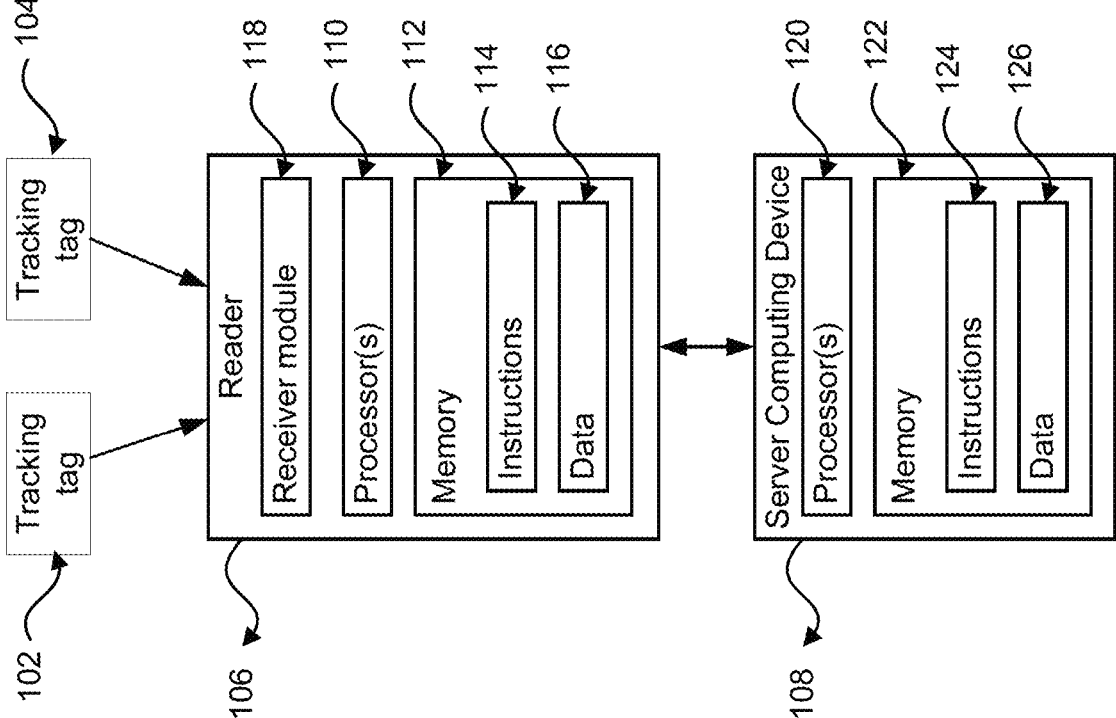
FIG. 1B is a functional diagram of an example tracking system in accordance with aspects of the disclosure.

FIG. 1B is a functional diagram of a tracking system 100 in accordance with aspects of the technology. The tracking system 100 may include a plurality of tracking devices, such as tracking tags 102 and 104, and a reader 106. As discussed further below, a server computing device (e.g., a central server) 108 may also be part of the tracking system 100. Each tracking tag may include one or more sensors, an identifier chip (such as for radiofrequency (RF) identification), and/or a transmitting device (such as an RF module configured to transmit information using a selected frequency band and transmission protocol). A tracking tag may be passive, such as a tag configured to activate or be powered by environmental energy. For example, environmental energy may include a transmission from a reader 106. A tracking tag may also be active, such as a tag configured to include a battery or be coupled to another power source. A given tracking tag may be placed on or otherwise attached to or inserted into an item to be tracked, like a package, a piece of equipment, a vehicle, a warehouse section, a room, etc. While tracking tags 102 may be associated with assets such as packages, equipment or vehicles (e.g., a forklift or an autonomous fulfillment robot that can retrieve packages from different locations in a warehouse), tracking tags 104 may be beacon tags configured to transmit beacon information from an aisle in a warehouse or from a specific room in a hospital. Different customers may have varying location accuracy and "liveliness" needs for different items. For instance, one customer may only want to know aisle-level accuracy every day (e.g., before a warehouse or fulfillment center closes for the evening), while another customer such as a hospital nurse may need to know which room a piece of equipment is in every hour so that it can be accessed should a patient need it.

The given tracking tag 102 or 104 is configured to emit a signal via an antenna, such as using the transmitting device, to communicate data. The data may be formatted according to a selected protocol and include one or more sensed characteristics of the given tracking tag or its environment. For example, the sensed characteristic(s) may include a temperature, a location, motion, current or projected battery status, trip/item conditions, and/or other detectable characteristics of the tracking device or its environment. The transmitting device may send such information via radiofrequency (RF) transmission in a selected frequency band, using a standard or proprietary protocol. By way of example, the transmitting device may employ a Bluetooth™ (e.g., a Bluetooth Low Energy (BLE)) or 802.11 protocol in the 2.4 GHz and/or 5 GHz frequency bands. In some examples, each beacon tracking tag and each asset tracking tag uses the Bluetooth™ or BLE protocol.

The reader 106 is a computing device configured to detect the signals emitted by the plurality of tracking tags 102 and 104, then store and/or transmit data related to the tracking tags. While only one reader is shown in FIG. 1B, the system may employ multiple readers. The reader 106 may include one or more processors 110, memory 112 and other components typically present in computing devices. The reader 106 includes a receiver module 118 having an antenna and a processing section (not shown), which may include a bandpass filter for the frequency band of interest, an analog to digital (A/D) converter, and a signal processing module to evaluate information in received signals. The processing section may also convert the received signal to a baseband signal, before or after A/D conversion.

The one or more processors 110 may be any hardware-based processors, such as commercially available CPUs or microcontrollers. Alternatively, the one or more processors may be a dedicated device such as an ASIC or other hardware-based processor, such as a field programmable gate array (FPGA). Although FIG. 1B functionally illustrates the processor(s), memory, and other elements of the reader 106 as being within the same block, the processor, computing device, or memory may actually include multiple processors, computing devices, or memories that may or may not be stored within the same physical housing. For example, the memory may be a hard drive, a removable USB drive or other non-transitory storage media located in a housing different from that of the reader 106. Accordingly, references to a processor or computing device will be understood to include references to a collection of processors or computing devices or memories that may or may not operate in parallel.

The memory 112 may store information accessible by the one or more processors 110, including instructions 114 and data 116 that may be executed or otherwise used by the processor(s) 110. The data may include sensed characteristics from any of the tags 102 and/or 104 received by the reader 106. The memory 112 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by processor(s) 110 in accordance with the instructions 114. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 114 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In some implementations, the tracking system 100 may further include a central server, such as one or more server computing devices 108 accessible by the one or more processors 110 of the reader 106. In some implementations, one or more tracking devices in the tracking system 100, such as a tracking tag 104, may be configured to obtain and communicate data directly to the server computing devices 108. The server computing devices 108 include one or more processors 120, memory 122 and other components typically present in computing devices. The one or more processors 120 may be the same or similar type as the one or more processors 110, and the memory 122 may be the same or similar type as the memory 112. The memory 122 stores information accessible by the one or more processors 120, including instructions 124 and data 126 that may be executed or otherwise used by the processor(s) 120. Data 126 and instructions 124 may be the same or similar type as the data 116 and instructions 114, respectively.

After detecting the signals of one or more tracking tags 102 or 104, the reader 106 may transmit the data from the tracking tags to the server computing devices 108 through an existing connection or through a network. Thus, in this case the reader 106 may include a transmitter module (not shown) that is configured for wired or wireless transmission to the server computing device. The data may be received in a series of payloads (e.g., data packets) either continually, at one or more set intervals, or ad hoc whenever the tracking tags transmit. Thus, when there are multiple tracking tags, the data is effectively received as a plurality of separate data streams. A given payload (which may comprise one or more data packets) may include measurements taken at one or more time intervals, each of which may have a corresponding timestamp. In one scenario, the reader 106 may include a transceiver including both a receiver and a transmitter, which is configured to receive signals from the tags 102 and 104 and also to send and receive information with the server computing device 108.

The server computing devices 108 may be configured to track or otherwise evaluate characteristics of the tracking devices for one or more alerts based on a plurality of conditions. The plurality of conditions may include at least one condition for each characteristic, such as a minimum, a maximum, a threshold, a duration, or a geofence. The conditions may be predetermined or set based on user input. For example, a first alert may be set for when (1) a temperature is greater than a temperature threshold, e.g., 0° C. to 10° C. for 30 minutes and (2) the tracking device is on a trip, which may indicate overheating of a cooled package or storage compartment. A second alert may be set for when (1) no motion is detected for X minutes (e.g., 10 minutes or more or less), (2) 2 of 3 locations are within a geofence, and (3) the tracking device is on a trip, which may indicate that a package is out for delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt. Many other alert conditions and tracking scenarios are possible, and the above examples are not intended to be limiting.

The tracking system 100 may optionally include an application that may be installed on one or more client computing devices. Using the application, the client computing devices may access the data from the reader 106 and/or the server computing device 108 through a network.

Figure 2:
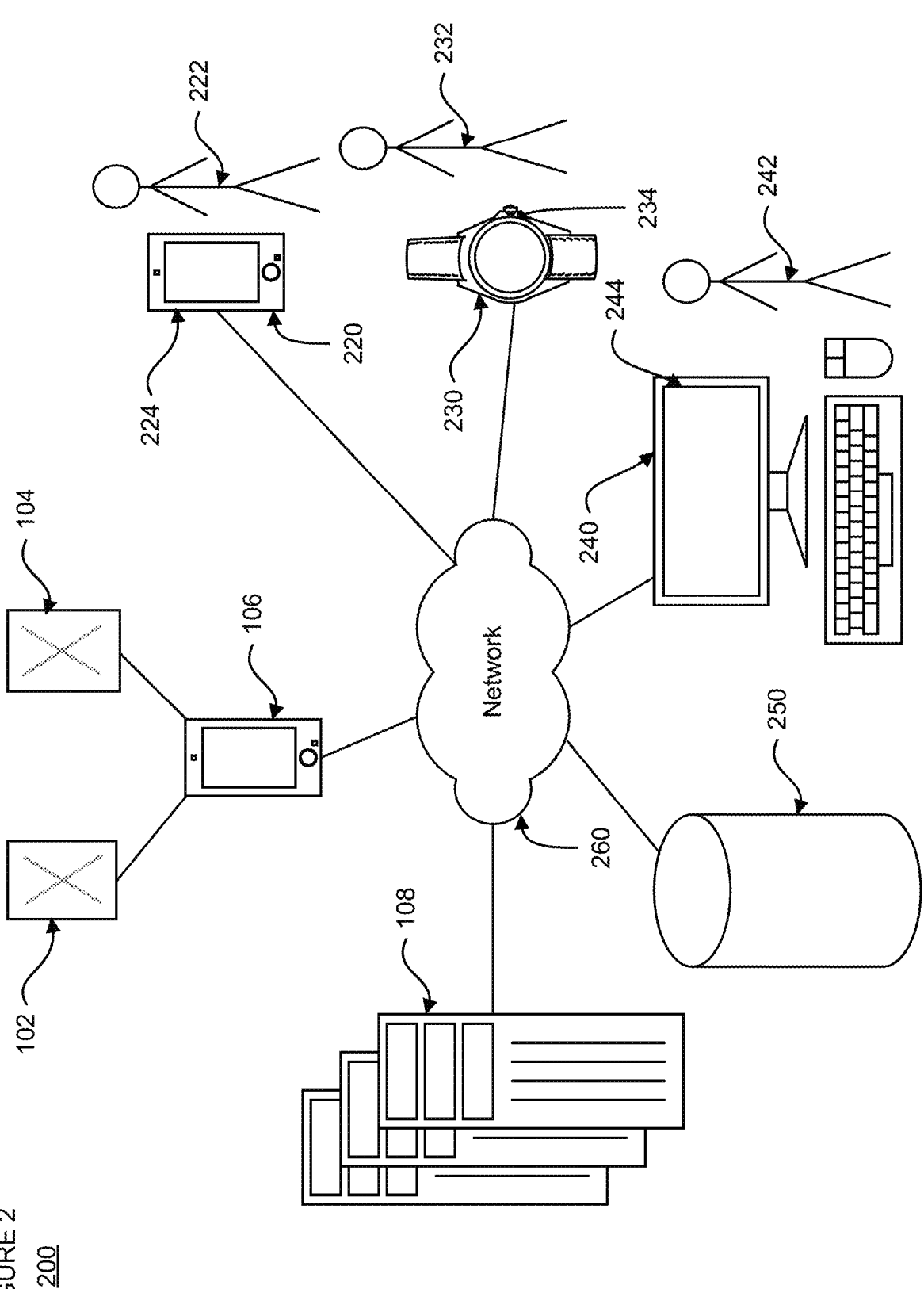
FIG. 2 is a pictorial diagram of an example network in accordance with aspects of the disclosure.
Figure 3:
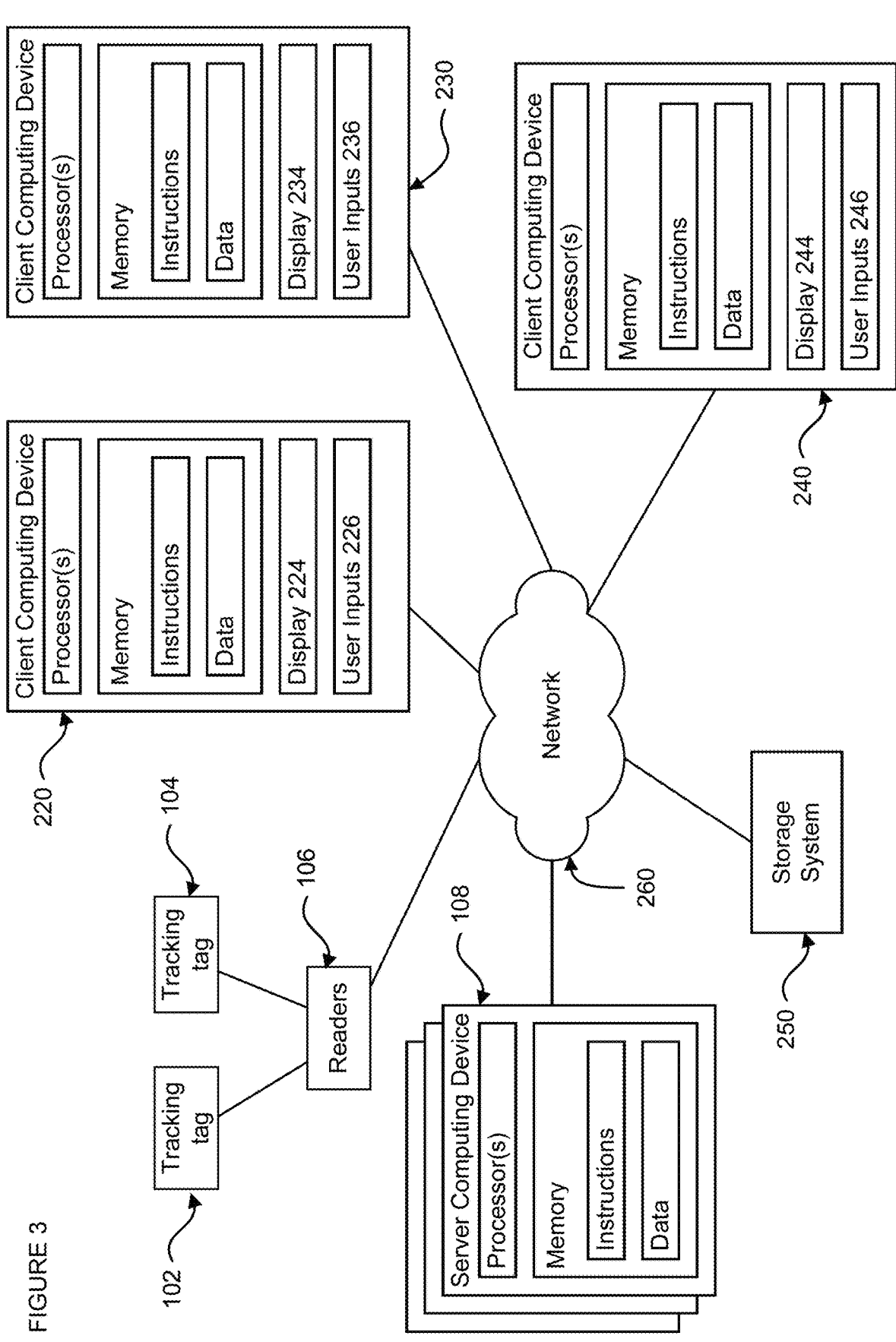
FIG. 3 is a functional diagram of the example network in FIG. 2 in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 102, 104, reader 106, and server computing device 108. Although only a few tags and computing devices are depicted for simplicity, a typical system may include significantly more.

Using the client computing devices, users, such as user 222, 232, 242, may view the location data on a display, such as displays 224, 234, 244 of respective computing devices 220, 230, 240. As shown in FIG. 3, each client computing device 220, 230, 240 may be a personal computing device intended for use by a respective user and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a head-mounted display, a smart-watch display, a projector, a television, or other device that is operable to display information), and user input devices 226, 236, 246 (e.g., one or more of a mouse, keyboard, touch screen and/or a microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system (e.g., a smartwatch or head-mounted display, or a netbook that is capable of obtaining information via the Internet or other networks. As an example, the user may input information using a small keyboard, a keypad, microphone, using visual signals (gestures) with a camera or other sensor, or a touch screen.

Figure 4:
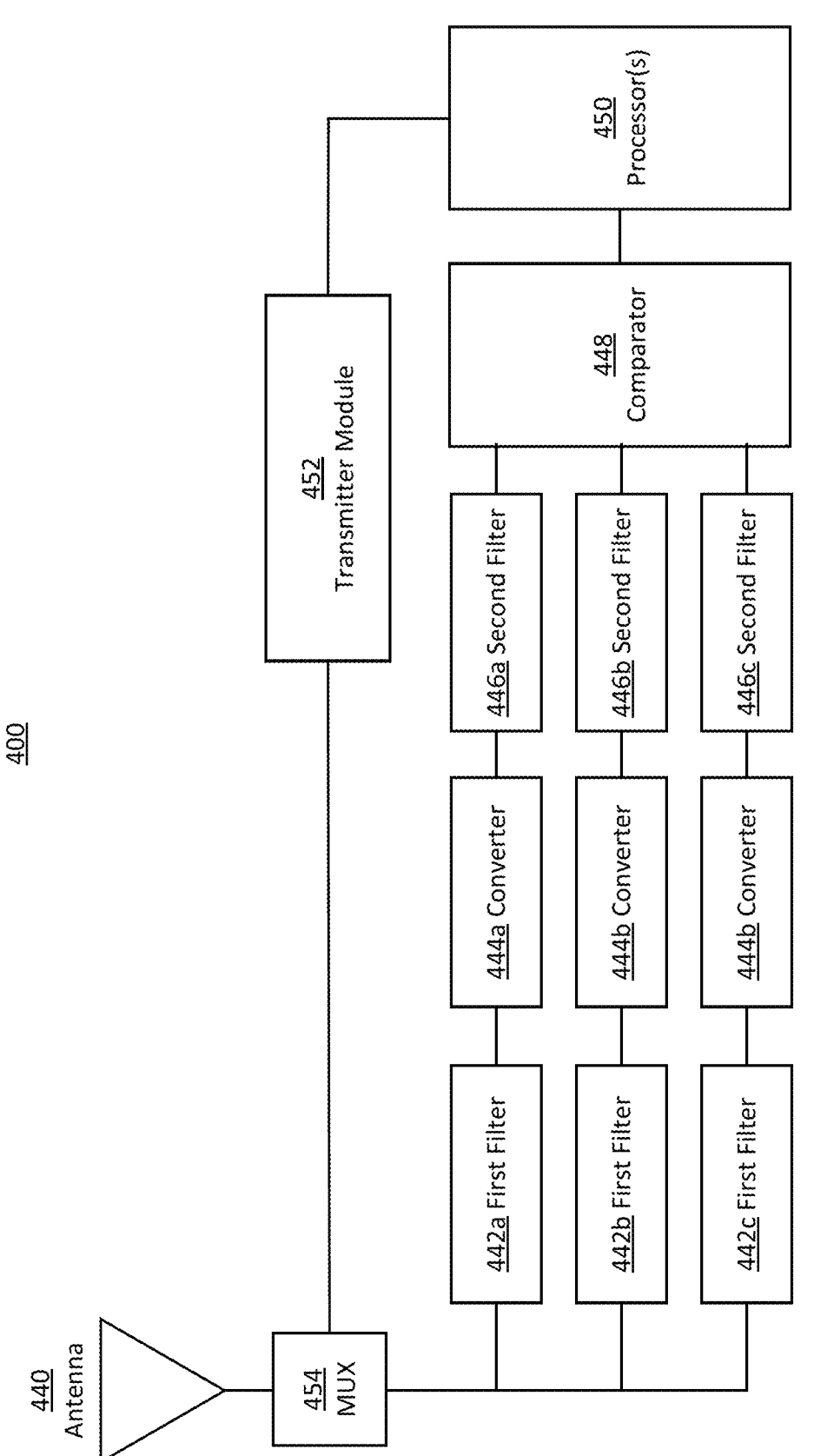
FIG. 4 is a block diagram of an implementation of a tracking tag 400 in accordance with aspects of the disclosure.

As seen in FIG. 4, the tracking tag(s), such as tracking tag 400, may include an antenna 440, one or more first filters or other signal conditioning elements 442, one or more converters 444, one or more second filters 446, a comparator 448, and one or more processors 450. The antenna 440 may be configured to transmit beacons to the reader(s) 106 of a system. The processor(s) 450 may generate one or more data packets of information to be transmitted and transmitter module 452 prepares the data packets for transmission via the antenna 440, for instance by upconverting to the frequency of a channel selected by the processor(s) 450, or otherwise converting the signal from the processor(s) 450 into a transmittable radio frequency signal. In some instances, the transmitter module 452 may include a voltage-controlled oscillator (VCO). The VCO may be configured to be pre-tuned to a channel of the system for transmission A multiplexer (MUX) 454 operatively coupled to the antenna 440 may be employed to separate receive and transmit operations. The tracking tag(s) may include other components not shown in FIG. 4.

In some implementations, the one or more first filters 442 may each comprise a bandpass filter (BPF), which may be configured to attenuate received radiofrequency signals outside a selected frequency range of the BPF. The selected frequency range may correspond to one or more channels of the system. By way of example only, the BPF may be a piezoelectric thin film acoustic resonator (FBAR) based filter and may be implemented on top of a complementary metal-oxide-semiconductor (CMOS) chip. The BPF may also be formed by an array of FBAR resonators, formed in series and parallel resulting in a BPF with a significant quality (Q) factor of, e.g., greater than 500. The thickness of each resonator of the filter can be changed to achieve tunable center frequencies to lock to the three or more frequency channels on which the energy is to be detected. Alternatively, contour mode resonators or flexural plate wave resonators may be implemented for additional selective frequency filtering. Contour mode resonators or flexural plate wave resonators may be configured to tune resonant frequencies by adjusting lithographically defined lateral dimensions. Additionally, contour mode resonators may be implemented in series or parallel. In some implementations, an ion-beam and/or laser beam-based film sputtering method may be implemented in forming the FBAR, contour mode, or flexural plate wave resonators to reduce the effects of residual stress therein and to form a compact resonator (e.g., reduced dimension resonator). In some implementations, the one or more first filters 442 may be constructed with a dimensionality and with passive inductors and capacitors such that the input and output impedance thereof corresponds to that of the antenna 440.

The converter(s) 444, may be configured to convert the signals filtered by the first filter(s) into voltages. In some instances, the converter(s) 444 may be configured as energy harvester(s) (EH) that each contain a rectifying circuit. The converter(s) 444 may be configured to convert the filtered signals into voltage or electromagnetic signals. The converter(s) 444 may be configured to convert the filtered signals without changing or having an effect on other characteristics such as, for example, phase and/or amplitude(s) 444. In some instances, the tracking tag 400 may further include a local oscillator (LO) (not shown) operatively coupled to the converters(s) 444. The LO may be configured to allow for a signal of the channels of the system to pass through each converter 444. In this regard, signals from the LO may be mixed with the attenuated signals from the one or more first filters at the converter(s) 444. The signals from the LO may correspond to the channels of the system. For example, in a three-channel system, a first signal corresponding with a first channel may be sent to a first comparator, a second signal corresponding with a second channel may be sent to a second comparator, and a third signal corresponding with a third channel may be sent to a third comparator.

In one instance, when the converters(s) 444 are EH(s), the converted signal may be used to power the comparator 448, the one or more processors 450, or the transmitter module 452 of the tracking tag, or any combination thereof. By way of example, an EH may be configured to capture and store radiofrequency energy. Captured radiofrequency energy may be multi-band radiofrequency energy, when antenna 440 is a multi-band antenna. The EH(s) of FIG. 4 may be operatively connected to an energy storage device (not shown), such as one or more capacitors or a rechargeable printed battery. The rectifying circuit of each EH may be configured to convert alternating current (AC) into direct current (DC) capable of powering components of the tracking tag or of being stored. In some implementations, the converter(s) may be implemented using diodes, or in CMOS using biased threshold transistors operating near the threshold such that the sensitivity of the EH(s) is improved by effectively reducing the threshold voltage for the rectifier.

The voltage signals from each converter 444 may be passed to a corresponding second filter 446 or other signal conditioning circuit. In some implementations, the one or more second filters 446 may be low pass filters (LPF), such as RC circuits. In one instance, the second filters 446 may be narrow filters (e.g., on the order of 1 MHz or less). The one or more second filters 446 may each output a voltage, which may be received by the comparator 448. The voltage value may be an average voltage value. In some implementations, the one or more second filters 446 may be implemented with one or more transistors and passive elements.

The comparator 448 is configured to compare values input therein. For example, the comparator 448 may be configured to compare power levels or voltage values of signals from the one or more second filters 446. In another example, the comparator 448 may be configured to compare power levels or voltage values from the one or more second filters 446 to one or more threshold values. In some instances, the comparator 448 may be further configured to detect a power level of signals from the one or more second filters 446. Alternatively, a power detector (not shown) may be included in tracking tag 400 between the one or more second filters 446 and the comparator 448. In this regard, the power detector may be configured to detect the power level of the signal(s) and input the detected power level(s) into the comparator. The detected power level(s) may be compared to one another or the one or more threshold values at the comparator 448.

Figure 5:
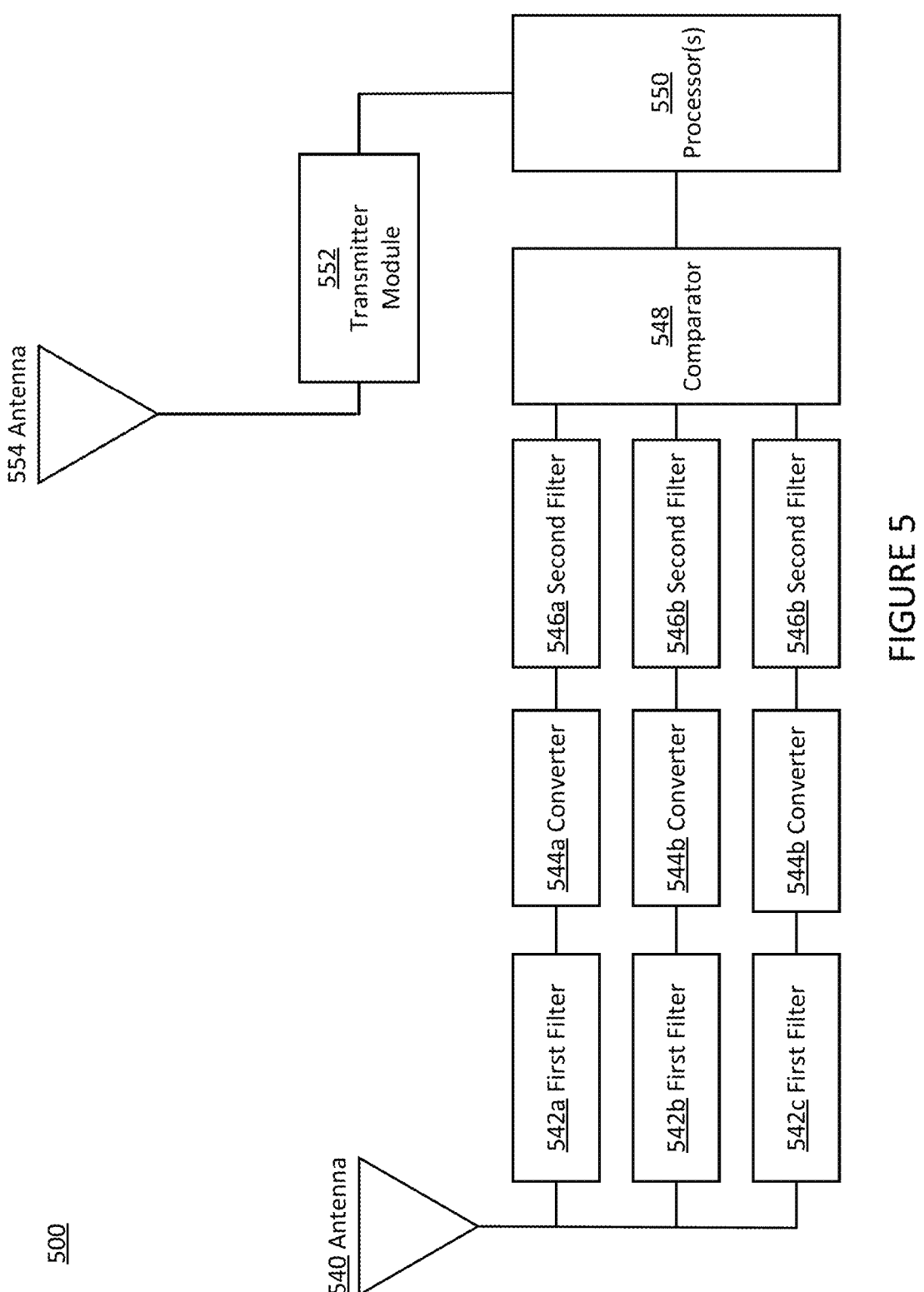
FIG. 5 is a block diagram of an implementation of a tracking tag 500 in accordance with aspects of the disclosure.

FIG. 5 illustrates an alternative architecture to FIG. 4, which employs separate receive and transmit antennas. In this regard, tracking tag 500 includes an antenna 540, one or more first filters or other signal conditioning elements 542, one or more converters 544, one or more second filters 546, a comparator 548, one or more processors 550, transmitter module 552 and antenna 554. Antenna 540 may be configured to receive signals and antenna 554 may be configured to transmit signals. Here, because separate antennas 540 and 554 are used to receive and transmit, respectively, no multiplexer may be required. Additionally, other components utilized to direct and/or separate transmits and receive signals such as a switch, splitter, coupler, or circulator may not be required.

The one or more first filters or other signal conditioning elements 542, the one or more converters 544, the one or more second filters 546, the comparator 548, the one or more processors 550, and the transmitter module 552 of FIG. 5 may be configured in the same manner as the one or more first filters 442, the one or more converters 444, the one or more second filters 446, the comparator 448, one or more processors 450, and transmitter module 452 of FIG. 4.

Figure 6:
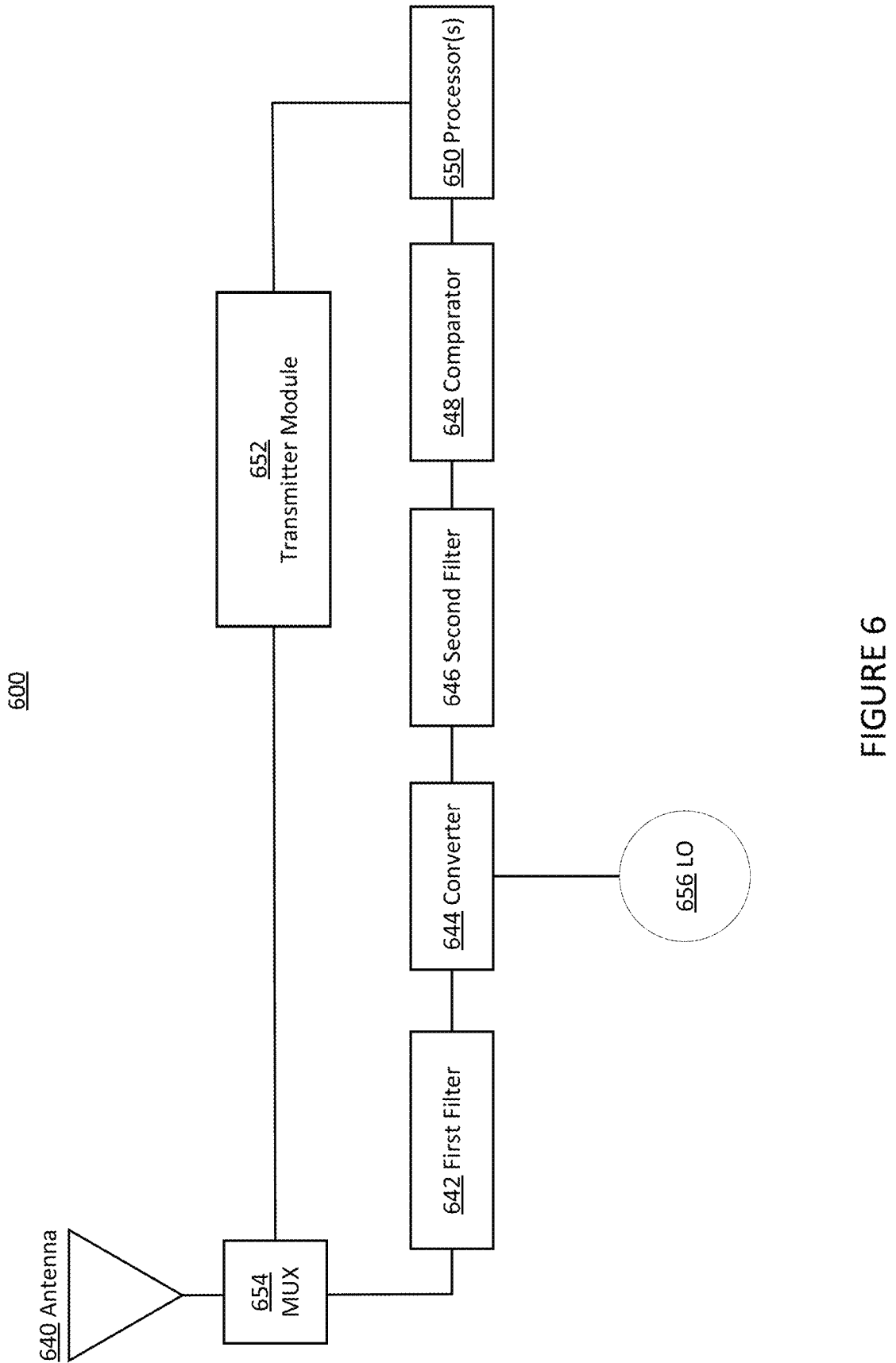
FIG. 6 is a block diagram of an implementation of a tracking tag 600 in accordance with aspects of the disclosure.

In some instances, as illustrated in FIG. 6, a tracking tag 600 includes one first filter 642, one converter 644, and one second filter 646. The tracking tag 600 further includes antenna 640, multiplexer 654, transmitter module 652, and one or more processors 650. The antenna 640, the first filter 642, the converter 644, the second filter 646, the multiplexer 654, the transmitter module 652, and the one or more processors 650 may be configured in the same manner as the antenna 440, the first filter 442, the converter 444, the second filter 446, the multiplexer 454, the transmitter module 452, and the one or more processors 450 of FIG. 4.

In this regard, after being detected by the antenna 640, a signal passes through the first filter 642. Similar to the one or more first filters 442, the first filter 642 may be configured to attenuate frequencies outside a particular range corresponding to channels used by the system. In this regard, the first filter 642 may be associated with the channels of the system. For example, in a system operating in the 2.4-2.48 GHz frequency band, the first filter 642 may be configured to attenuate signals outside of the range of in the 2.4-2.48 GHz Like one or more first filters 442, in some implementations, first filter 642 may be a bandpass filter (BPF). The first filter 642 may be a MEMS structure selected to have a high Q value (e.g., on the order of 1200 or higher).

The attenuated signal from the first filter may also pass through converter 644 (e.g., an envelope detector or energy harvester (EH) circuit). Like the one or more converters 444, converter 644 may be configured to convert the band-limited signal into a corresponding voltage or electromagnetic signal. The converter 644 may be configured to convert the filtered signals without changing or having an effect on other characteristics such as, for example, phase and amplitude. In some instances, the tracking tag 600 may further include a local oscillator (LO) 656 operatively coupled to the converters 644. The LO may be configured to allow for a signal of a channel of interest of the system to pass through the converter 644. In this regard, a signal from the LO may be mixed with the attenuated signal from the first filter. The signal from the LO may correspond to the channel of interest.

In some instances, the LO may be pre-tuned to the channel of interest within the system. In one example, the channel may be the highest frequency channel of the system. In such an example, a system may use, e.g., a first channel, a second channel, and a third channel (although more than three channels may be employed). The first channel may be a higher frequency channel than the second and third channels, and the second channel may be a higher frequency channel than the third channel. In this regard, the LO may be pre-tuned to the first channel.

In one instance, converter 644 may be an energy harvester containing a rectifying circuit. In such an instance, the converter 644 may be configured in the same manner as the converter(s) 444, discussed above. In this regard, the converter 644 may be configured to convert the signal into voltage to power the comparator 648 or the one or more processors 650 of the tracking tag 600, or both. While not shown, there may be a separate power supply connection from the converter to the comparator and/or the processor.

The signals from the converter 644 may be passed to the second filter 646 or other signal conditioning circuit. In some implementations, like the one or more second filters 446, the second filter 646 may be a low pass filter (LPF), such as an RC circuit. In one instance, the second filter 646 may be a narrow filter (e.g., on the order of 1 MHz or less). The second filter 646 may output a voltage, which may be received by the comparator 648. The voltage value may be an average voltage value. In some implementations, the second filter 646 may be implemented with one or more transistors and passive elements.

Like comparator 448, comparator 648 may be configured to compare values input therein. For example, the comparator 648 may be configured to compare power levels or voltage values from the second filter 646 to one or more threshold values. In some instances, the comparator 648 may be further configured to detect a power level of signals from the second filter 646. In one scenario, power detection at the converter 644 can be designed for high sensitivity, e.g., on the order of −33 dBm (or more or less). Alternatively, a power detector (not shown) may be included tracking tag 600 between the second filter 646 and the comparator 648. In this regard, the power detector may be configured to detect the power level of the signals.

Example Methods

In addition to the aspects described above and illustrated in the figures, various operations will now be described. It should be understood that the following operations do not have to be performed in the precise order described below.

The system may be configured to determine state information of items having tracking tags (e.g., tags 102,104 shown in FIG. 1B). In order to determine state information of the items, the system may require a transmission of data from the tracking tags on each item, on a package containing multiple items, a pallet storing a number of packages, etc. As discussed herein, the system determines state information using beacon transmissions received from one or more tracking tags 102,104, which may be intended for detection by one or more readers 106. The tracking tags 102,104 may be configured to detect traffic from other tags on at least one channel used by the system.

For example, in FIG. 4 the antenna 440 of tracking tag 400 may detect, or sample, signals in the surrounding environment. The signals may be radio frequency (RF) signals in one or more channels or frequency bands. Such signals may be from other nearby tags, or from other types of devices operating in the same channels or frequency bands (e.g., the 2.4-2.48 GHz or 5.7-5.8 GHz ISM bands). In some implementations, the tracking tag 400 may utilize a passive technique, as discussed above, allowing for the detection of ultra-low power radio frequency channel signals. In such a technique, the tracking tags 400 do not need clocking information or require demodulation of the detected signals.

As shown in FIG. 4, after being detected by the antenna 440 of a tracking tag 400, a signal may pass through one or more first filters 442. The one or more first filters 442 may be configured to attenuate frequencies outside a particular range. The range of the one or more first filters 442 may correspond to a channel used by the system. In some implementations, the one or more first filters 442 may be bandpass filters (BPF), each associated with a different, non overlapping channel. The one or more first filters 442 may be MEMS structures selected to have a high Q value (e.g., on the order of 1200 or higher). In some implementations, such as the example illustrated in FIG. 4, the tracking tag 400 has three first filters (but may have more or fewer filters), where each first filter has a different pass band corresponding to a channel used by the system.

In some implementations, the attenuated signal from each first filter passes through a respective converter 444 (e.g., an envelope detector or energy harvester (EH) circuit). The one or more converters 444 may be configured to convert the band-limited signals into a corresponding voltage. When the one or more converters 444 are EHs each containing a rectifying circuit, such devices may be configured to convert the signals into voltage to power the comparator 448 or the one or more processors 450 of the tracking tag 400, or both. While not shown, there may be a separate power supply connection from the converter(s) to the comparator and/or the processor. As shown in the example of FIG. 4, the tracking tag 400 contains the same number of converters 444 as first filters 442, where each converter 444 corresponds to a respective first filter 442. In one scenario, power detection at the converter(s) 444 can be designed for high sensitivity, e.g., on the order of −33 dBm (or more or less).

The resultant voltage signal then may pass through a corresponding second filter 446. The one or more second filters 446 may separately output an average voltage value of each signal. The voltage value may correspond to the power of the signal (e.g., corresponding to the received signal strength at the antenna). In some implementations, the one or more second filters 446 may be conditioning circuits (e.g., passive RC circuits; low pass filter (LPF)). As shown in FIG. 4, the tracking tag 400 may contain the same number of second filters 446 as first filters 442 and converters 444, where each second filter 446 corresponds to a converter 444 and a first filter 442. In some implementations, from the one or more first filters 442 through the one or more converters 444 and the one or more second filters 446, the system may operate passively (i.e., without any supplied power). As noted above, this approach may not need clocking information or require demodulation of the detected signals.

The set of signals output from each second filter 446 may be applied to the comparator 448. The comparator 448 may compare the power levels of the signal from each second filter 446 and determine which signal, if any, has the lowest power level. Here, the lowest power level may indicate that the corresponding channel has less "noise" or is less busy (e.g., due to signals from other tags) than the other channels. Based on the comparator's 448 determination, the one or more processors 450 may select the channel corresponding to the signal with the lowest power (corresponding to the least busy channel at that moment in time). The one or more processors 450, via the transmitter module 452, then may transmit a beacon on the selected channel via the antenna 440. This transmission may occur immediately upon determining the least busy channel, e.g., within 10-100 microseconds or more or less. In some instances, for example, the transmission may occur during a time slot of the tracking tag 400. The time slots may be based on relative time of the tracking tag 400. For example, each time slot may be 20 μs. During the 20 μs time slot the tracking tag 400 may determine if the channel is clear (e.g., not busy). The tracking tag may then transmit the beacon during the 20 μs time slot. The 20 μs time slot time slot is merely exemplary. In some instances, a time slot may be more or less in duration. For example, the time slots may be on the order of 10-100 microseconds or more or less.

FIG. 5 illustrates an alternative architecture to FIG. 4, which employs separate receive and transmit antennas. As shown in FIG. 5, after being detected by antenna 540 of a tracking tag 500, a signal may pass through one or more first filters 542. The one or more first filters 542 or other signal conditioning elements may be configured to attenuate frequencies outside a particular range. The range of the one or more first filters 542 may correspond to a channel used by the system. As discussed above for FIG. 4, in some implementations, the one or more first filters 542 may be bandpass filters (BPF), each associated with a different, non overlapping channel. The attenuated signal from each first filter may pass through a respective converter 544 (e.g., an envelope detector or energy harvester (EH) circuit). As with the converters 444, the one or more converters 544 may be configured to convert the band-limited signals into a corresponding voltage. When the one or more converters 544 are EHs each containing a rectifying circuit, such devices may be configured to convert the signals into voltage to power comparator 548 or one or more processors 550 of the tracking tag 500, or both. While not shown, there may be a separate power supply connection from the converter(s) to the comparator and/or the processor. The voltage signals from each converter 544 may be passed to corresponding second filters 546 or other signal conditioning circuits. In some implementations, the one or more second filters 546 may be low pass filters (LPF), such as RC circuits. The one or more second filters 546 each output an average voltage, which is received by the comparator 548. As with FIG. 4, the comparator 548 may compare the power levels of the signal from each second filter 546 and may determine which signal, if any, has the lowest power level. Based on the comparator's determination, the one or more processors 550 may select the channel corresponding to the signal with the lowest power (corresponding to the least busy channel at that moment in time). The one or more processors 550, via the transmitter module 552, then may transmit a beacon on the selected channel via the antenna 554. In some instances, as discussed above, the transmission may occur during a time slot of the system. Here, because separate antennas 540 and 554 are used to receive and transmit, respectively, no multiplexer may be required. Additionally, other components utilized to direct and/or separate transmits and receive signals such as a switch, splitter, coupler, or circulator may not be required. Otherwise, the architecture of FIG. 5 may operate in the equivalent manner to the architecture of FIG. 4.

In some implementations for either the architecture of FIG. 4 or the architecture of FIG. 5, the comparator may be additionally configured to determine if the power level of one or more of the signals is above a threshold value. In this case, when the power level of a signal is above the threshold value, the one or more processors may deem the corresponding channel to be busy. If the channel corresponding to the signal with the lowest power is deemed to be busy, the one or more processors may delay transmission of the beacon. In one example, the threshold for each channel may be adjusted independently. For instance, a channel in the middle of the 2.4 GHz band may have a different threshold than channels on either end of that band. Otherwise, the one or more processors then sends a beacon on the least busy channel via the antenna. If the power levels of all the signals are above a selected level, then the one or more processors 450 may delay sending transmission for a predetermined time, e.g., up to 100-300 milliseconds (or more or less). In some instances, the delay may be random slot backoff. In this regard, the tag may wait a random period of time before transmitting again. The random period of time may correspond to a random number of time slots. Continuing on the above example, with a 20 μs time slot, the tracking tag 400 may select a random number, e.g., 0-15. The random number may correspond to a number of time slots or a time slot counter. In such an example, during the time slot duration of 20 μs, the tracking tag may determine if the channel(s) of the system is clear or busy. If the channel(s) of the system is clear, the one or more processors 450 of the tracking tag 400 may decrease the time slot counter by one. If the channel(s) of the system are busy, the one or more processors 450 of the tracking tag 400 may not decrease the time slot counter. When the channel(s) of the system are clear and the time slot counter is 0, the tracking tag 400 may transmit the beacon. In this regard, the transmissions of tags may be segmented such that when tags are delaying transmission, the end of the delay for each tag is not identical. This may help prevent problematic interference of multiple tag transmissions starting immediately after a preceding transmission on the air ends.

Following the delay of any transmission, the one or more processors 450 may send out a beacon on the least busy channel. In some instances, as discussed above, the transmission may occur during a time slot of the system In one example, the threshold value(s) may be stored in a table in memory of the device. Alternatively, the threshold value(s) may be determined dynamically or updated, such as by monitoring historical channel parameters (e.g., over the last 10-30 seconds, last few minutes or hours, or over some other timeframe). In such an implementation where the threshold values are determined dynamically, the determination may, for example, start with an initial threshold value and increase the threshold value by an incremental amount if the power level of all of the channels remains above the initial threshold for a predetermined period of time (e.g., 1-10 seconds or more or less).

In some implementations, following the delay of any transmission, the tracking tag may re-sample signals from the environment to determine if the power levels of any channel are below the selected level. If the power level is below the selected level, the one or more processors may then transmit a beacon on the corresponding channel, either immediately (e.g., in the next 1-20 milliseconds, or more or less), or after a selected delay (e.g., on the order of 50-500 milliseconds, or more or less). If the power levels of all the channels are still above the selected level, then the one or more processors may delay any transmission. In some instances, the transmission may occur during a time slot of the system. Additionally, in some instances, the delays may be random slot backoff as discussed above. The tracking tag may re-sample the environment and repeat the determination until a power level for at least one channel is below the selected level, or the tracking tag may re-sample the environment a set number of times during a beacon transmission period or other time range. For example, if after the tracking tag re-samples three times and the power levels of all the channels are still above the selected level, then the one or more processors may be configured to send a beacon on the least busy channel. The set number of re-sampling may be variable, for instance based on a time of day, historical channel information, or an amount of information to be transmitted.

Similar to the architecture of FIG. 4 or the architecture of FIG. 5, the comparator 648 of FIG. 6 may be configured to determine if the power level of one or more of the signals is above a threshold value. In this regard, the comparator 648 may be configured to determine if the power level of the signal is above a threshold value. If the power level of the signal is below the threshold value, the one or more processors 650 may transmit a beacon via transmitter module 652 and antenna 640 (or in some implementations, a second antenna such as shown in FIG. 5). In some instances, the transmitter module 652 may be pre-tuned for transmission on the channel of interest. In this regard, a VCO of the transmitter module 652 may be pre-tuned to the channel of interest.

If the power level of the signal is above the threshold value, the one or more processors 650 may deem the corresponding channel of interest to be busy. In one example, if the channel of interest is deemed to be busy, the one or more processors 650 may delay transmission of the beacon for a predetermined time, e.g., up to 100-300 milliseconds (or more or less). Following the delay of any transmission, the one or more processors 650 may send out a beacon on the channel of interest. As discussed above, the transmission may occur during a time slot of the system. Additionally, as discussed above, the delays may be random slot backoff as discussed above. In one example, the threshold value may be stored in a table in memory of the device. Alternatively, in some instances, the threshold value may be determined dynamically or updated, such as by monitoring historical channel parameters (e.g., over the last 10-30 seconds, last few minutes or hours, or over some other timeframe). In such an instance, the determination may, for example, start with an initial threshold value and increase the threshold value by an incremental amount if the power level of the channel of interest remains above the initial threshold for a predetermined period of time (e.g., 1-10 seconds or more or less).

In another example, if the channel of interest is deemed busy, following the delay of any transmission, the tracking tag may re-sample signals from the environment to determine if the power level of the channel of interest is below the threshold value. If the power level is below the threshold value, the one or more processors 650 may then transmit a beacon on the channel of interest via transmitter module 652 and antenna 640 (or in some implementations, a second antenna such as shown in FIG. 5). In some instances, the transmitter module 652 may be pre-tuned for transmission on the channel of interest. In this regard, a VCO of the transmitter module 652 may be pre-tuned to the channel of interest. The one or more processors may either transmit immediately (e.g., in the next 1-20 milliseconds, or more or less), or after a selected delay (e.g., on the order of 50-500 milliseconds, or more or less). If the power level of the channel of interest is still above the threshold value, then the one or more processors 650 may delay any transmission. As discussed above, the transmission may occur during a time slot of the system. Additionally, as discussed above, the delays may be random slot backoff as discussed above. The tracking tag may re-sample the environment and repeat the determination until a power level for at least one channel is below the selected level, or the tracking tag may re-sample the environment a set number of times during a beacon transmission period or other time range. For example, if after the tracking tag re-samples three times and the channel of interest is still above the threshold value, then the one or more processors 650 may be configured to send a beacon. The set number of re-sampling may be variable, for instance based on a time of day, historical channel information, an amount or type of information to be transmitted, etc.

In one example, following the delay of transmission and/or a determination that the channel of interest is busy, the tracking tag 600 may be configured to re-sample or further resample the environment to determine if the power level of a different channel of the system is below a threshold value. The threshold value of the different channel of the system may be the same or different as the threshold value of the channel of interest. The comparator 648 may determine if the power level of the different channel is above the threshold value and the one or more processors 650 may determine if the different channel is busy in the same manner as discussed above with respect to the channel of interest. To make a determination, the LO 656 may be adjusted such that a signal of the LO corresponds to the different channel of the system. Additionally, transmitter module 652 (e.g., VCO of the transmitter module 652) may be adjusted for transmission on the different channel.

The tracking tag may re-sample the environment and repeat the determination on additional channels of the system until a power level for at least one channel is below the selected level, until re-sampling has been completed a set number of times during a beacon transmission period, or until a time period has elapsed. For example, if after the tracking tag re-samples three times and the power levels of all the analyzed channels are above the selected level, then the one or more processors may be configured to send a beacon on the least busy channel or last analyzed channel. The set number of re-sampling may be variable, for instance based on a time of day, historical channel information, or an amount of information to be transmitted.

In this regard, FIG. 7 illustrates an example method 700 of beacon scheduling within a tracking system. At block 702, the method includes, receiving a radiofrequency signal, at an antenna, from a surrounding environment. In this regard, antenna 640 may receive a radiofrequency signal from an environment surrounding the tracking tag 600.

At block 704, the method includes attenuating the radiofrequency signal at a first signal conditioning element coupled to the antenna, the first signal conditioning elements being configured to attenuate received radiofrequency signals outside a selected frequency range. The selected frequency range may correspond to one or more channels of the system. In this regard, the first filter 642 may be configured to attenuate frequencies outside a particular range corresponding to channels used by the system. For example, in a system operating in the 2.4-2.48 GHz frequency band, the first filter 642 may be configured to attenuate signals outside of the range of in the 2.4-2.48 GHz.

At block 706, the method includes converting the attenuated signal at a converter having an input operatively coupled to the first signal conditioning elements, wherein the converter is configured to convert attenuated signals from the first signal conditioning element into a voltage corresponding with a channel of interest of the tracking system. In this regard, the attenuated signal from the first filter 642 may also pass through converter 644 (e.g., an envelope detector or energy harvester (EH) circuit). Converter 644 converts the attenuated signal into a corresponding voltage or electromagnetic signal. The converter 644 may convert the attenuated signals without changing or having an effect on other characteristics such as, for example, phase and amplitude. In some instances, the conversion may include mixing the attenuated signal from the first filter with a signal from an LO. In this regard, the LO 656 may produce a signal corresponding with a channel of interest of the system. In some instances, the LO may be pre-tuned to the channel of interest within the system.

At block 708, the method includes averaging the converted signal at a second signal conditioning element operatively coupled to an output of the converter, wherein the second signal conditioning element is configured to output a voltage value of the converted signal. In this regard, the signal from the converter 644 may be passed to the second filter 646 or other signal conditioning circuit. The second filter 646 may output a voltage, which may be received by the comparator 648. The voltage value may be an average voltage value.

At block 710, the method includes comparing, by a comparator operatively coupled to the second signal conditioning element, the converted signal to a threshold value. In this regard, the comparator 648 may be configured to detect the power levels or the voltage of the converted signal to a threshold value. In some instances, the method may further include detecting a power level of the converted signal. The power level may be detected at for example, comparator 648 or a power detector disposed between the second filter 646 and the comparator 648. In some instances, the method may further include updating the threshold value. The threshold value may be undated in the manner discussed above.

At block 712, the method includes, determining, by one or more processors, to transmit a beacon signal on the channel of interest based on the comparison. In this regard, the one or more processors 650 may be configured to determine to transmit, delay transmit, or re-sample the environment based on the comparison. The determination may include determining if the channel of interest is busy. For example, the one or more processors 650 may determine the channel of interest is busy if the power or voltage of the converted signal is above the threshold value. Similarly, the one or more processors may determine the channel is not busy if the power or voltage of the converted signal is below the threshold value. If the channel of interest is determined to not be busy, the one or more processors 650 may 650 may transmit a beacon via transmitter module 652 and antenna 640 in the manner discussed above. If the channel of interest is determined to be busy, the one or more processors 650 may delay transmission and/or re-sample the environment as discussed above. The re-sampling may include analyzing channels other than the channel of interest.

FIG. 8 illustrates an example method 800 for channel selection within a tracking system comprising. As shown in block 802, the method includes receiving radiofrequency signals, at an antenna, from a surrounding environment. At block 804, the method includes attenuating the radiofrequency signals at a set of first signal conditioning elements coupled to the antenna, the set of first signal conditioning elements being associated with a different channel and being configured to attenuate the received radiofrequency signals outside a selected frequency range for a corresponding channel. At block 806 the method includes converting the attenuated signals at a set of converters each having an input operatively coupled to a corresponding one of the set of first signal conditioning elements, the set of converters each configured to convert attenuated signals from each corresponding first signal conditioning element into a voltage. At block 808 the method includes averaging the converted signals at a set of second signal conditioning elements each operatively coupled to an output of a corresponding one of the set of converters, each second signal conditioning element being configured to output a voltage value of each converted signal. At block 810, the method includes comparing, by a comparator operatively coupled to the set of second signal conditioning elements, the converted signals, the comparator being configured to compare the voltage value of each converted signal to identify whether there is one channel having a lowest power level among the different channels. And at block 812, the method includes selecting a channel, by one or more processors operatively coupled to the comparator, to cause a beacon signal to be transmitted to a reader apparatus via the channel having the lowest power level.

The features and methodology described herein may provide a system that is able to address potential interference of beacon signals on channel(s) used by the system. The architecture reduces the amount of lost beacon data by avoiding busy or otherwise noisy channels and/or time slots. No clocking or demodulation is required for received signals, and the components can be formed in simple circuits that do not require significant die or circuit board area. The approach can improve data quality with beacon clusters and/or where there is external in-band RF noise. Additionally, the interference reduction lessens wasted transmit power from transmitting when channels are busy. The system described in some implementations herein is particularly desirable as the tracking tags utilizing passive methodology for tracking items do not require discrete battery sources in implementing interference reduction. Collectively, the system delivers a low cost and minimalistic solution resulting in better signal quality and minimal power usage.

From the foregoing and with reference to the various figure drawings, those skilled in the art will appreciate that certain modifications can also be made to the present disclosure without departing from the scope of the same. While several implementations of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular implementations.

The invention claimed is:

1. A tracking tag, comprising:
a transmitter module, wherein the transmitter module is pre-tuned to a channel of interest;
an antenna configured to receive radiofrequency signals from a surrounding environment;
a first signal conditioning element coupled to the antenna, the first signal conditioning element being configured to attenuate received radiofrequency signals outside a selected frequency range, the selected frequency range corresponding to one or more channels of a tracking system;
a converter coupled to the first signal conditioning element, wherein the converter is configured to convert attenuated signals from the first signal conditioning element into a voltage corresponding with the channel of interest of the tracking system;
a second signal conditioning element coupled to an output of the converter, wherein the second signal conditioning element is configured to output a voltage value of a converted signal from the converter;
a comparator operatively coupled to the second signal conditioning element, wherein the comparator is configured to compare the voltage value of the converted signal to a threshold value; and
one or more processors operatively coupled to the comparator and the transmitter module, the one or more processors being configured to transmit a beacon signal on the channel of interest, via the transmitter module, based on a comparison of the comparator.

2. The tracking tag of claim 1, wherein the one or more processors are further configured to transmit the beacon signal when a power level for the channel of interest is below the threshold value.

3. The tracking tag of claim 1, wherein the one or more processors are further configured to delay transmission of the beacon signal when a power level for the channel of interest is above the threshold value.

4. The tracking tag of claim 3, wherein the one or more processors are configured to delay transmission of the beacon signal when the power level for the channel of interest is above the threshold value for a predetermined period of time or a random period of time.

5. The tracking tag of claim 1, wherein the voltage value of the converted signal is an average voltage value.

6. The tracking tag of claim 1, wherein:
the transmitter module is configured to prepare the beacon signal based on information from the one or more processors for transmission, and
the tracking tag further includes a multiplexer operatively coupled to the transmitter module and the antenna configured to separate receive operations and transmit operations.

7. The tracking tag of claim 1, wherein:
the antenna is a first antenna configured to only receive radiofrequency signals from the surrounding environment, and
the tracking tag further includes a second antenna operatively coupled to the one or more processors and the transmitter module, the second antenna being configured to transmit the beacon signal.

8. The tracking tag of claim 1, wherein:
the antenna is configured to re-sample the surrounding environment; and
the converter is configured to convert attenuated signals from the first signal conditioning element into a voltage corresponding with a second channel distinct from the channel of interest.

9. The tracking tag of claim 1, wherein:
the converter is an energy harvester configured to harvest energy from attenuated signals, and
the comparator and the one or more processors are configured to be powered by energy harvested by the energy harvester.

10. A method of beacon scheduling within a tracking system, the method comprising:
pre-tuning a transmitter module for transmission on a channel of interest;
receiving a radiofrequency signal, at an antenna, from a surrounding environment;
attenuating the radiofrequency signal at a first signal conditioning element coupled to the antenna, the first signal conditioning element being configured to attenuate the received radiofrequency signals outside a selected frequency range, the selected frequency range corresponding to one or more channels of the tracking system;
converting the attenuated radiofrequency signal at a converter having an input operatively coupled to the first signal conditioning element, wherein the converter is configured to convert attenuated signals from the first signal conditioning element into a voltage corresponding with the channel of interest of the tracking system;
averaging the converted radiofrequency signal at a second signal conditioning element operatively coupled to an output of the converter, wherein the second signal conditioning element is configured to output a voltage value of the converted radiofrequency signal;
comparing, by a comparator operatively coupled to the second signal conditioning element, the voltage value of the converted signal to a threshold value; and
determining, by one or more processors, to transmit a beacon signal on the channel of interest via the transmitter module based on the comparison.

11. The method of claim 10, further comprising: determining, by the one or more processors, whether a power level of the channel of interest is above or below the threshold value.

12. The method of claim 11, further comprising: delaying transmission of the beacon signal when the power level of the channel of interest is above the threshold value.

13. The method of claim 12, wherein delaying transmission of the beacon signal when the power level of the channel of interest is above the threshold value occurs for a predetermined period of time or a random period of time.

14. The method of claim 11, further comprising:
repeating the steps of claim 11 when the power level of the channel of interest is above the threshold value.

15. The method of claim 14, wherein the steps of claim 11 are repeated a maximum number of times during a timestep when the power level of the channel of interest is above the threshold value.

16. The method of claim 11, further comprising:
transmitting, by the antenna, the beacon signal when the power level of the channel of interest is below the threshold value.

17. The method of claim 11, further comprising transmitting, by a second antenna, the beacon signal when the power level of the channel of interest is below the threshold value.

18. The method of claim 10, further comprising mixing, at the converter, a signal from a local oscillator (LO) with the attenuated radiofrequency signal from the first signal conditioning element; wherein the LO is pre-tuned to the channel of interest.

19. The method of claim 10, further comprising updating the threshold value, wherein the threshold value is updated incrementally.

\* \* \* \* \*